July 8, 1958  A. B. BELGARD  2,842,028
PLASTIC SPECTACLE FRAME INLAYS
Filed June 23, 1953
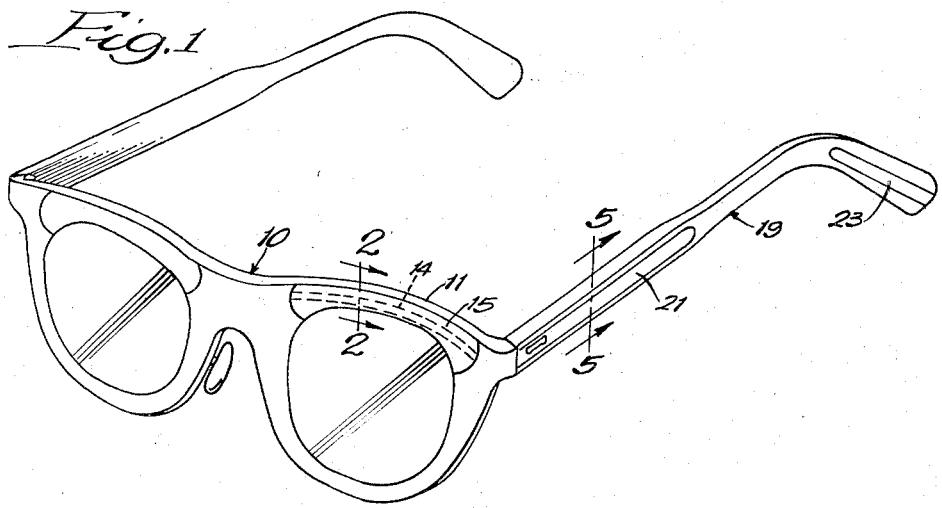
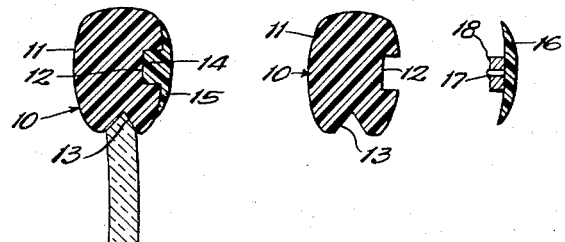
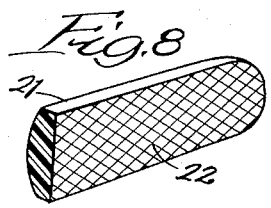
INVENTOR:
Austin B. Belgard,
BY
Dawson, Tilton & Graham
ATTORNEYS.

2,842,028

PLASTIC SPECTACLE FRAME INLAYS

Austin B. Belgard, Evanston, Ill.

Application June 23, 1953, Serial No. 363,447

1 Claim. (Cl. 88—41)

This invention relates to plastic spectacle frame inlays, and the like.

An object of the invention is to provide means for forming inlays of various types within a plastic frame. A further object is to provide a structure in which inlays of various colors and contrasting designs may be applied upon a plastic glasses frame while the same is upon the wearer to determine the desired effect, the inlays being readily secured in permanent position after the selection of the appropriate inlays. Yet another object is to provide means whereby inlays may be effectively secured within the formed cavity without overflow of cement while preventing the cement from presenting an unsightly appearance. A still further object is to provide means for securing inlays for strengthening or decorative purposes at selected points upon the eyeglass frame, including the temple thereof, and in combination with the frame or temple structures. Other specific objects and advantages will appear as the specification proceeds.

The invention is shown, in an illustrative embodiment, by the accompanying drawing, in which—

Figure 1 is a perspective view of a spectacle frame showing the application of inlays to the frame and temple thereof; Fig. 2, a broken enlarged sectional view, the section being taken as indicated at line 2—2 of Fig. 1; Fig. 3, an enlarged sectional view of the temple portion with the inlay removed; Fig. 4, a sectional view of a modified form of inlay; Fig. 5, a transverse sectional view of a frame portion such as the temple, showing an inlay applied thereto, the section being taken as indicated at line 5—5 of Fig. 1; Fig. 6, a view similar to Fig. 5 but with the inlay removed; Fig. 7, a sectional view of the inlay adapted to be inserted within the structure shown in Fig. 6; and Fig. 8, a perspective view of a portion of the temple inlay showing the scoring thereon.

In the illustration given, 10 designates a glasses frame having the top portion 11 thereof provided with a slot or recess 12. At the bottom of the top wall 11 is the usual lens-receiving recess 13.

Within the recess 12, I insert an inlay bar 14 having integrally formed therewith a front shield portion 15. The inlay 14 may be secured in place by cement, solvent, or by any other suitable material.

In the illustration given in Fig. 4, I provide a front shield portion 16 which may be formed of metal or other suitable material and provided with rearwardly inclined pins 17 received within a plastic inlay bar 18. The plastic inlay bar 18 may be secured within the recess 12 by means of cement or solvent, etc.

In the modification shown in Figs. 5, 6, 7 and 8, the temple 19 is provided with a recess 20 and secured within the recess 20 is an inlay 21. The inlay 21, of plastic or the like, may be secured within the recess 20 by the use of adhesive, solvent, or other suitable material.

In the operation of the frame structure shown, the inserts or inlays may be of contrasting colors and may be tried upon the glasses frame while the frame is being worn by the user. The technician may select inlays of varying colors in contrast with the plastic of the frame, including the temple, and the desired effect from the combination observed while the glasses are upon the wearer. When a pleasing combination has been obtained, the technician may then permanently secure the inlays within the frame, whereby the frame is not only rendered attractive, but is strengthened through the addition of the inlays.

A difficult problem has existed for many years in connection with the use of cement in recesses, in that the cement not only has the tendency to form irregular blotches within and about the frame, but also it tends to overflow, forming an unsightly area about the insert. I have discovered that by scoring or forming small indentations within the inner surface of the insert, a very effective union of the two parts can be accomplished without tendency for the cement to overflow. Excess cement tends to flow into the indentations or scoring, and the blotches or irregular areas of glue disappear and no longer form unsightly spots within the frame. Apparently the glue follows the regular lines or indentations provided and does not remain in solid irregular spots on the inner surface of the insert. Further, the scoring gives a decorative effect to the inner surface of the frame and temple. In the illustration given in Fig. 8, the recessed lines or scoring are indicated by the numeral 22.

It will be observed that in the temple 19 an insert 21 is formed along the outer side face of the temple, and that a similar insert 23 is formed at the very end of the temple. It will be understood that the inserts or inlays may be placed at various points along the temple and glasses frame, where reinforcement or decorative strips are desired.

While, in the foregoing specification, I have set forth specific structures in considerable detail for the purpose of illustrating the invention, it will be understood that such details of structure may be varied widely by those skilled in the art without departing from the spirit of my invention.

I claim:

In a temple-equipped spectacle plastic frame, a frame portion having a recess therein with an inner flat surface at the base of the recess, a plastic inlay adapted to be frictionally received within said recess and releasably retained therein by friction, said inlay having also an inner surface adapted to contact the inner surface at the base of said recess, at least one of said inner surfaces being provided with indentations adapted to receive adhesive, an outer shell carried by said plastic inlay and adapted, when said inlay is within said recess, to lie flush against the surface of the frame to cover the marginal portions of said recess, and a solvent adhesive bond within said indentations and uniting said inlay to said frame within said recess.

References Cited in the file of this patent

UNITED STATES PATENTS

| | | |
|---|---|---|
| 2,629,196 | Splaine | Feb. 24, 1953 |
| 2,712,774 | Belgard | July 12, 1955 |

FOREIGN PATENTS

| | | |
|---|---|---|
| 977,201 | France | Nov. 8, 1950 |
| 984,689 | France | Feb. 28, 1951 |